United States Patent [19]

Richardson, Jr.

[11] Patent Number: 5,792,325
[45] Date of Patent: *Aug. 11, 1998

[54] ELECTRIC ARC MATERIAL PROCESSING SYSTEM

[76] Inventor: William H. Richardson, Jr., 1496 Giles St., Palm Bay, Fla. 32907

[*] Notice: The terminal 15 months of this patent has been disclaimed.

[21] Appl. No.: 708,516

[22] Filed: Sep. 5, 1996

Related U.S. Application Data

[63] Continuation-in-part of Ser. No. 854,938, Mar. 20, 1992, which is a continuation-in-part of Ser. No. 613,094, Nov. 15, 1990, abandoned, which is a continuation-in-part of Ser. No. 329,983, Oct. 27, 1994, Pat. No. 5,692,459, which is a continuation-in-part of Ser. No. 162,342, Dec. 2, 1993, Pat. No. 5,435,274.

[51] Int. Cl.$^6$ ........................................ B01J 19/08
[52] U.S. Cl. .............. 204/164; 204/225; 422/186.21; 422/186.26
[58] Field of Search ................... 204/164, 225; 422/186.26, 186.21

[56] References Cited

U.S. PATENT DOCUMENTS

| | | |
|---|---|---|
| 603,058 | 4/1898 | Eldridge. |
| 4,702,894 | 10/1987 | Cornish ........................... 422/186.26 |

Primary Examiner—Arun S. Phasge
Attorney, Agent, or Firm—Charles A. McClure

[57] ABSTRACT

Electric arc material-processing system wherein an underwater spark gap is defined in a reactor by spaced graphite electrodes and a conductive carbon rod provided endwise to the gap. The electrodes are rotated by mechanical means, intermittently or continuously. Carbon and water are thereby converted into fuel gas, evolving from the arc, and comprising hydrogen as the major constituent and carbon monoxide as predominant minor constituent. Both the fuel and its combustion products are substantially free from contaminants found customarily in petroleum-based fuels and their combustion products. Surplus heat enables water from any source to be rendered potable.

14 Claims, 3 Drawing Sheets

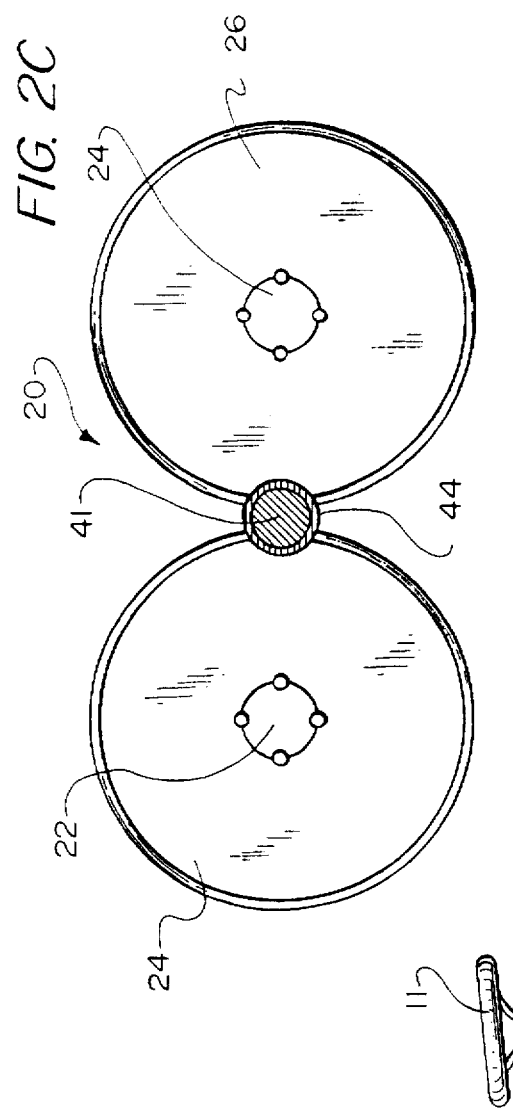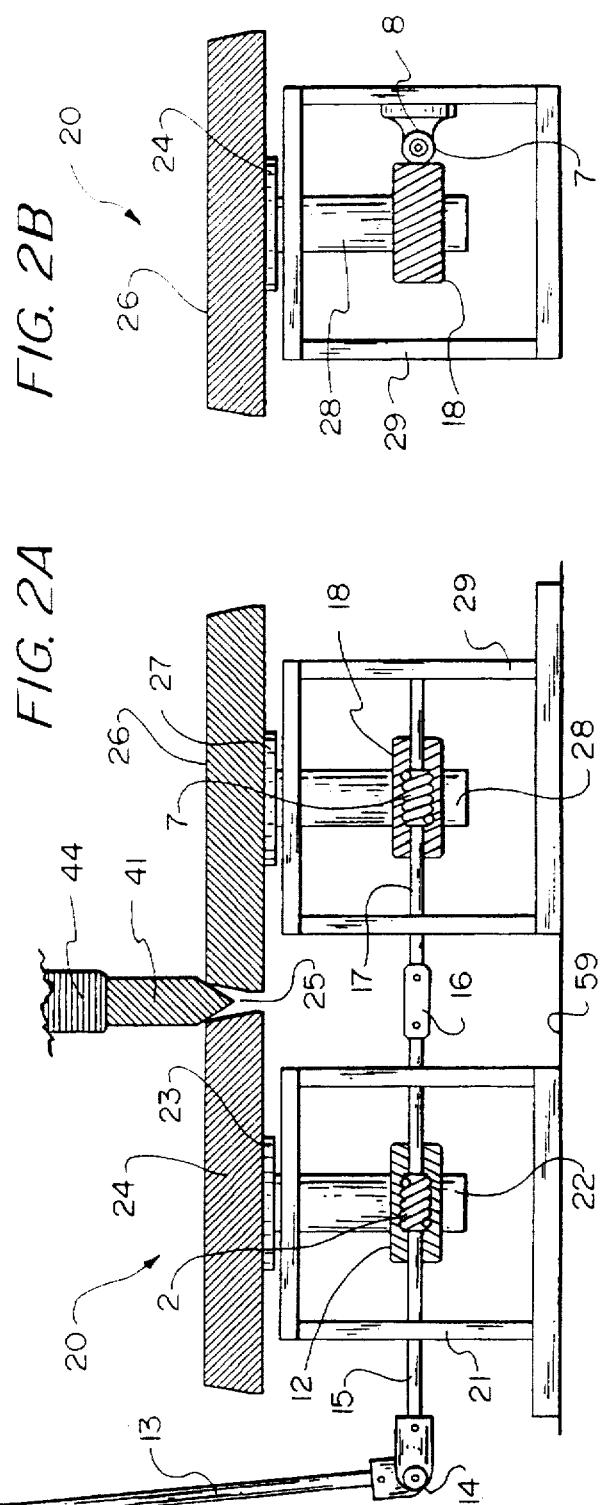

ELECTRIC ARC MATERIAL PROCESSING SYSTEM

This application is a continuation-in-part of patent application Ser. No. 07/854,938 filed Mar. 20, 1992, which is a continuation-in-part of 07/613,094, filed Nov. 15, 1990 now abandoned. This application is a continuation-in-part of application Ser. No. 08/329,983 filed Oct. 27, 1994 now U.S. Pat. No. 5,692,459 which is a continuation-in-part of 08/162,342 filed Dec. 2, 1993 now U.S. Pat. No. 5,435,274.

TECHNICAL FIELD

This invention relates to electric arc apparatus, especially as useful under water, where a consumable solid material is introduced into the arc, as in cylindrical form.

BACKGROUND OF THE INVENTION

Various electrode arrangements are shown in U.S. patents for processing materials in electric arc or plasma conditions, such as rod and disc in U.S. Pat. No. 603,058; adjustably spaced in-line electrodes in U.S. Pat. No. 5,159,900; coaxial in U.S. Pat. Nos. 5,298,714 and 5,399,829; and hollow in-line in U.S. Pat. No. 5,296,672. Flow directions and/or rotating magnetic fields may confine the arc, such as in the latter patent.

In an underwater electric arc welding, wherein solid consumable material is introduced—whether as an electrode or otherwise—it is preferable to control consumption of it and of electrode material generally, even where consumption of such material is intentional.

Underwater evolution of fuel by electric arcing imposes its own requirements upon electrode arrangements, especially as consumption of graphite electrodes is involved in arc processing of carbon rods. The present invention is directed toward controlling interrelation of consumable carbon rods provided to such electrodes, themselves also consumable, and with the desired effects upon all of them.

SUMMARY OF THE INVENTION

A primary object of the present invention is to improve the evolution of fuel from underwater carbon arcing.

Another object of this invention is to assure even consumption of carbon rods introduced into an underwater arc.

A further object of the invention is to assure even consumption of underwater arcing graphite electrodes.

Yet another object of this invention is to improve production of gaseous fuel made from carbon and water by underwater arcing.

A still further object is to achieve the foregoing objects with minimal expenditure of effort and expense.

In general, the objects of the present invention are attained, in a reactor containing underwater electric arcing apparatus, by means of graphite electrodes spaced apart by a given distance at the nearest approach of their respective edges, making up a spark gap.

More particularly, the electrodes are substantially disklike and are mounted relative to one another so their respective nearest edges at the given spark gap are movable in opposite directions.

Further, conductive rods of carbon composition are introduced successive into the gap, each to be rotated about its own axis by contact of its end with the oppositely moving electrode edges. Such contact will usually prove intermittent under AC energization of the electrodes, and more nearly continuous with DC energization thereof Other objects of this invention, together with methods and means for attaining the various objects, will become apparent from the following description and the accompanying diagrams of at least one embodiment, presented by way of example rather than limitation.

SUMMARY OF THE DRAWINGS

FIG. 2A is a side elevation of a first embodiment of electrode apparatus and vicinity in the plant of FIG. 1;

FIG. 2B is an end elevation of the same electrode embodiment;

FIG. 2C is a plan view (partly in section) of this embodiment of electrode apparatus, taken from above the level of FIG. 2A;

DESCRIPTION OF THE INVENTION

Figure 1:
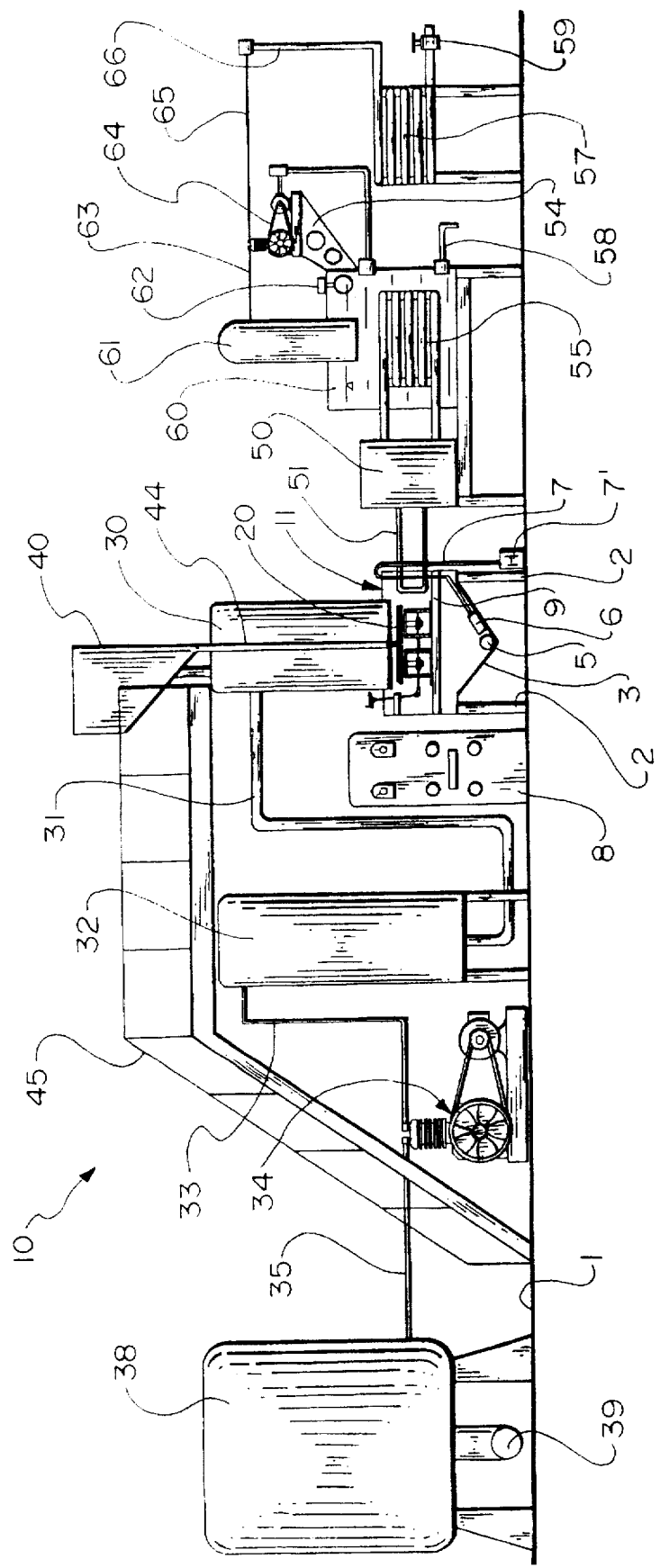
FIG. 1 is a schematic side elevation, partly sectioned, of a manufacturing plant, including a reactor according to the invention.

FIG. 1 shows schematically, in side elevation, fuel manufacturing plant 10, viewable as three main areas: production at the right center, collection/storage at the left, and temperature control and distillation area at the far right—from a viewer's point of view.

Prominent in the FIG. 1 production area are reactor assembly 11 (partly cut away or sectioned to reveal its interior) and electrical supply equipment 8 upright on the floor alongside it. Reactor bed 3 slopes down to its center, which is provided with drain outlet 5 and with sludge pump 6 connected by sludge line 7 to collection can 7'. Horizontal baffle 9 well above the bed supports electrode assembly 20 immersed in water (not shown here) nearly filling the reactor. Hood 30 overlies the electrodes and extends thereabove to collect fuel gas evolved from the water (not indicated here) in the reactor.

At the mid-left in FIG. 1, stairway 45 leads from the floor up and over to magazine 40, loadable from time to time with consumable carbon rods (not shown here) to be fed downward via discharge tube 44 and out endwise between the respective electrodes of assembly 20. At the left of the reactor, collection line 31 leads from hood 30 to segregation tank 32, which prevents entrained water and particulates from contaminating the collected fuel. Line 33 leads therefrom to compressor 34, which forwards the collected gas to storage tank 38, having underneath it valved gas outlet 39, available for connection to transportable tanks—or intervening pipeline—to user locations.

At the right in FIG. 1, heat pump assembly 50 connects loop 51 in the reactor to larger loop 55 in tank 60 filled with water. Hood 61 overlying that tank has exhaust line 63 leading from it to to evacuation compressor 64 mounted on bracket 54 attached to the tank and actuated by temperature sensor 62 in the top of the tank. The compressor discharges into hot air/steam line 65 connected to line 66 down to condenser 57 with drain tap 59 below at the far right.

Operation of the components shown and described in FIG. 1 is deferred until after a more detailed showing and description of the representative electrode assembly embodiments of this invention.

FIGS. 2A, 2B, 2C show first electrode assembly embodiment 20, from the side, end, and top, respectively. As shown most fully in FIG. 2A, twin stands 21, 29 rise upright from baffle 59, to support axles 22, 28 in bearings (not shown) in the horizontal tops of the stands. Disk-like electrodes 24, 26 retained on enlarged holders 23, 27 on the tops of the axles form gap 25 at the closest approach to each other. The peripheral edges of the disks are tapered so that their top the perimeter is less than their bottom perimeter. Intruding, from above, down into the gap and into contact with edges of both electrodes is rod end 41 (also shown tapered here) emerging from discharge tube 44 of magazine 40 (hidden here). The axles also carry at their lower ends, within the respective stands, respective pinion gears 12 and 18 engaged by drive gears 2 and 7, carried on respective bracket-supported bearings (8 shown here for gear 28) for aligned shafts 15 and 17 interconnected by swivel 16. The shafts interconnect via universal joint 14 to shaft 13 and are rotatable by turning manual rotary crank handle 11 (top left).

Figure 3B:
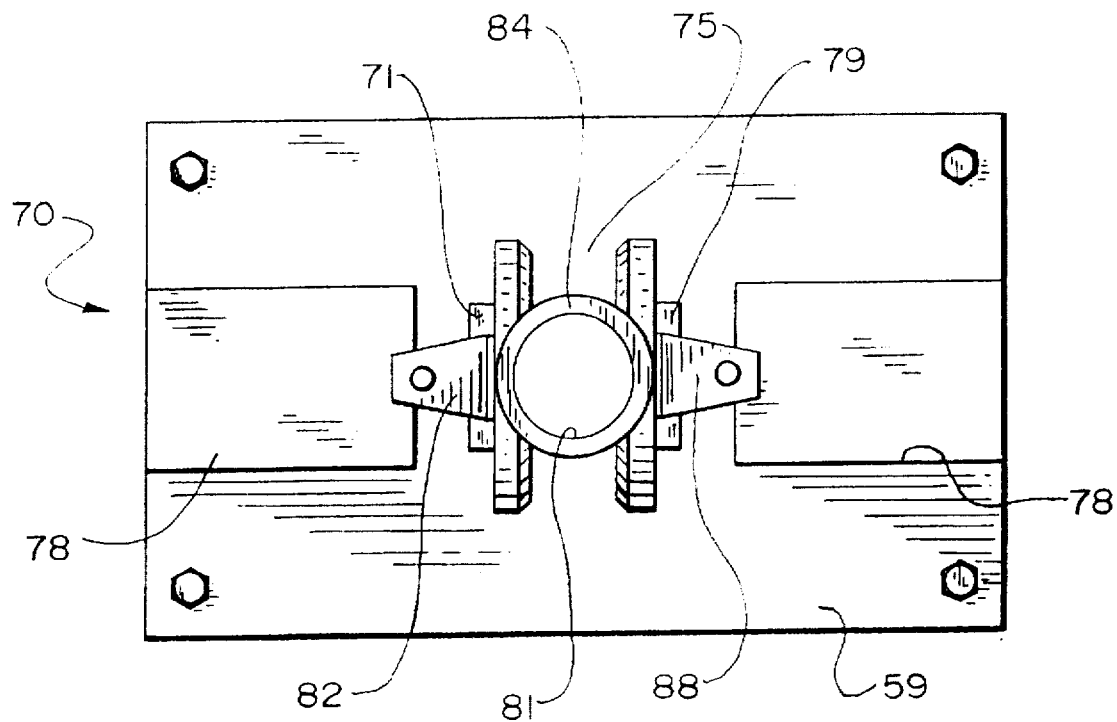
FIG. 3B is a plan view (partly in section) of the latter embodiment of electrode apparatus, taken from above FIG. 3B.
Figure 3A:
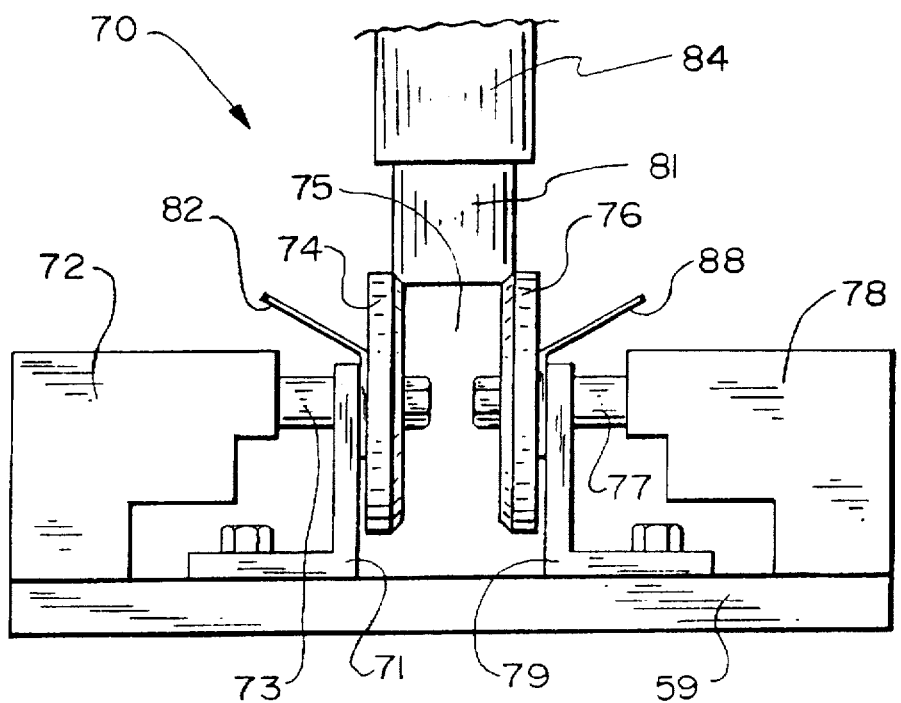
FIG. 3A is a side elevation, partly cut away, of another embodiment of electrode apparatus similarly useful in the plant of FIG. 1.

FIGS. 3A and 3B show another electrode assembly embodiment 70, from the side and top, which differs from the previous embodiment mainly by having the disklike electrodes mounted on (and rotatable about) a horizontal axis in place of the previous vertical axes, and substituting a motor drive for the previous manual rotation. Thus, is twin angle brackets 71, 79 rise upright from baffle 59 to which they are bolted, to support axles 73, 77 in bearings (not shown) in the vertical parts of the stands. Pair of disklike electrodes 74, 76 are mounted on those horizontal axle shafts of waterproofed gear-drive motors 72, 78, with gap 75 at their closest approach to each other. The tip of rod 81 protrudes from the bottom end of discharge tube 84 and intrudes from above into the gap and into contact with edges of both electrodes. Winglike flanges 82, 88, retained against the angle brackets, are slip-ring plates connected to the power supply, which extend over axles 73, 77 to protect them from the arc.

The operation of the apparatus of this invention is understood readily, as summarized below, in view of the foregoing description and the accompanying diagrams. Reference numerals are omitted here.

The electrode disks are assembled to their respective axles and the reactor is filled with enough water to submerge the electrodes. With AC or DC energizing electricity in the range of about 50 v. to 100 v. applied to the electrodes,the first conductive rod is lowered toward the gap between the pair of electrodes, and when the rod tip gets close enough an arc bridges the electrodes. Bubbles evolve from the arc and rise to the surface of the water. The gaseous contents of the bubbles collect under the hood and are pumped from there through a segregation tank to a large tank for storage under a pressure up to several thousand p.s.i. or a couple hundred kg/cm$^2$.

The water in the reactor tends to get progressively hotter but is kept relatively cool, preferably about 140° F. (60° C.) by heat-exchange in the temperature-control system, enabling the generation of steam for whatever use and the condensation of potable water from the steam whether formed from brackish, polluted, or even sea water.

Both the conductive rod and the electrodes are consumed bit by bit by the electric arc, as is the water, whose level is maintained above the arc by added water or recirculation of steam condensate. The rods are consumed relatively rapidly and are fed in succession from the magazine above the reactor. The electrodes being consumed more slowly, they are rotated, either intermittently as in the first electrode embodiment, or continuously as in the other embodiment, to distribute their erosion evenly along their peripheral edges. Rotation of the electrodes about either vertical or horizontal axes (or alternatively about oblique axes) rotates the rods by contact so they also erode evenly. When the electrodes have eroded close to their axles the reactor is shut down temporarily to enable electrode replacement and appropriate maintenance, such as reactor cleaning.

As my issued patent and pending patent applications disclose in more detail, the evolved gas is a superior fuel because it does not contain a miscellany of organic molecules, whose combustion requires a variety of conditions that cannot coexist during their combustion, as is true of all petroleum-based fuels. Instead, the gaseous fuel evolved by means of the apparatus disclosed in my previous efforts and in this application burns cleanly to carbon dioxide and water, free of incompletely combusted gaseous or solid materials, including carbon monoxide, carbonaceous particulates, miscellaneous organic materials, etc. Lower temperature of combustion eliminates noxious nitrogen oxides accompanying the flashback customary when internal-combustion engines are fueled with pure hydrogen. This fuel also contains surplus oxygen, thus assuring conversion of component carbon monoxide to carbon dioxide, and conversion of hydrogen to water. Other common petroleum fuel contaminants are also absent.

No unusual component materials are required by this invention. The electrodes are preferably relatively pure graphite. Suitably conductive carbon rods are are available from suppliers of welding materials. The conductive rods are customarily composed of similar carbon that conducts electricity satisfactorily for the purpose. It may be finely divided carbon (or carbonaceous) fragments bound by compression, with or without added binder. Waste carbon-containing materials are routinely available inexpensively from many sources, relative to customarily costly carbon-containing industrial solids. Rod diameter for an applied gap voltage may be as little as a centimeter or so at about 50 v. and may be as much as ten centimeters or so at 100 v. or higher. A modest amount of experimentation should optimize rod composition and diameter for applied voltage and type.

Water is a low-cost raw material almost everywhere, especially as it need not be potable or even relatively pure--as noted above. Of course, use of brackish, polluted, or sea water will necessitate periodic cleaning and maintenance of the reactor tank, the electrode supports and rotation means, and connected water-circulation lines.

The temperature increase in the reactor water provides an added advantage of this invention, by enabling production of potable water from the same or practically any other water by using the surplus heat to vaporize whatever water may be selected, and by subsequently condensing it into potable condition, regardless of its origin, as by exposing the distilled vapor to ambient temperature.

The electricity requirement is modest because the electrical resistance across a conducting spark gap is a minor fraction of the the resistance across the same gap when spark-free. The fuel is capable of doing much more work than its production entails. Nature bound that extra work capacity in the constituent materials, and the gap conduction heating enables recovery of such chemical potential.

The major constituent of this fuel gas is hydrogen, whereas its predominant minor constituent is carbon monoxide. The fuel is less explosive than gasoline, yet its components are readily combustible. It may be stored in usual high-pressure gas cylinders or in special vehicleadapted storage cylinders. It may be liquefied for storage, if the avantages of liquid fuel outweigh the liquefaction costs.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

I claim:

1. Apparatus for fuel production via underwater electric arcing, comprising electrode means including a plurality of electrodes rotatable with their peripheral edges spaced apart by a given spark gap across which an electric arc occurs when the electrodes are energized;

rotative means for rotating the electrodes with respective electrode peripheral edges moving in opposite directions at their closest approach to one another; and magazine means for dispensing consumable conductive rods successively end-on to the given gap, where peripheral electrode contact tends to rotate such rod about its own cylindrical axis.

2. Apparatus according to claim 1, wherein the conductive rods comprise carbon, and their cylindrical axis is substantially vertical, whereby their dispensing is facilitated by gravitation.

3. Apparatus according to claim 1, wherein the spaced electrodes comprise graphite and are consumable in the arc.

4. Apparatus according to claim 1, wherein the electrodes are on substantially vertical axes with the electrode edges spaced apart by less than apart by less than the rod cross-section, whereby the rods are rotatable by edge contact with the electrodes when rotating in the same direction about their respective axes.

5. Apparatus according to claim 1, wherein the the electrodes are on a single substantially horizontal axis with the electrode edges spaced apart by less than the rod cross-section, whereby the rods are rotatable by contact with the electrodes when rotating in opposite directions about their mutual axis.

6. Apparatus according to claim 1, including DC energizing means for the electrodes, effective to render conductive rod contact with at least one of the DC-energized electrodes substantially continuous.

7. Apparatus according to claim 1, including AC energizing means for the electrodes, effective to render conductive rod contact with the AC-energized electrodes intermittent.

8. Apparatus according to claim 1, wherein the electrodes are maintained immersed in water and when energized sustain underwater arcing across the gap only with a conductive rod in substantial contact therewith.

9. Apparatus according to claim 1, including a gas-collecting hood laterally surrounding the rod-dispensing means, overlying the underwater electrodes, and positioned so as to collect gaseous fuel evolving from the vicinity of the underwater electrodes when arcing.

10. Fuel-manufacturing underwater arc apparatus, comprising means for supporting rotatable arc-producing electrodes having their respective peripheral edges spaced apart at their closest by a potential spark gap somewhat less than the diameter of a conductive carbon rod of a type consumable in the arc;

the leading end of each successive rod being in substantial alignment with spaced peripheral edge portions of the electrodes at the gap between the electrodes when electrically energized; and means for dispensing successive conductive rods end-on into the gap, each such rod being rotatable about its own axis by frictional contact with one or more of the electrodes when rotating.

11. Fuel-manufacturing apparatus according to claim 10, and wherein the rotatable electrodes are so supported on substantially vertical axes, and including drive means effective so to rotate the respective electrodes.

12. Fuel-manufacturing apparatus according to claim 10, and wherein the rotatable electrodes are so supported on horizontal axes, and including drive means effective so to rotate the respective electrodes.

13. Fuel-manufacturing apparatus according to claim 10, and wherein the conductive carbon rods are fed with gravity aid downward to the gap wherein the end of a rod bridges the spaced electrodes.

14. Fuel-manufacturing apparatus according to claim 10, and wherein the conductive carbon rods are supplied from a magazine in which they are stored pending being fed to the electrode gap.

* * * * *